(12) United States Patent
Liu

(10) Patent No.: US 12,369,113 B2
(45) Date of Patent: Jul. 22, 2025

(54) SERVICE SLICE ACTIVATION METHOD AND SERVICE SLICE ACTIVATION APPARATUS, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 430 days.

(21) Appl. No.: 18/003,191

(22) PCT Filed: Aug. 3, 2020

(86) PCT No.: PCT/CN2020/106509
§ 371 (c)(1),
(2) Date: Dec. 23, 2022

(87) PCT Pub. No.: WO2022/027161
PCT Pub. Date: Feb. 10, 2022

(65) Prior Publication Data
US 2023/0247541 A1 Aug. 3, 2023

(51) Int. Cl.
*H04W 48/18* (2009.01)
*H04W 12/69* (2021.01)
(52) U.S. Cl.
CPC ........... *H04W 48/18* (2013.01); *H04W 12/69* (2021.01)
(58) Field of Classification Search
CPC .................. H04W 48/18; H04W 12/69
See application file for complete search history.

(56) References Cited

U.S. PATENT DOCUMENTS

| 2017/0079059 | A1* | 3/2017 | Li ........................ H04W 16/02 |
| 2018/0007552 | A1 | 1/2018 | Bae et al. |
| 2018/0019871 | A1* | 1/2018 | Gage ................... G06F 21/6209 |
| 2018/0191782 | A1 | 7/2018 | Djordjevic et al. |
| 2019/0141081 | A1 | 5/2019 | Kunz et al. |
| 2019/0327670 | A1 | 10/2019 | Bogineni et al. |
| 2020/0280854 | A1* | 9/2020 | Kunz ................ H04W 12/0431 |

(Continued)

FOREIGN PATENT DOCUMENTS

| CN | 109429277 A | 3/2019 |
| CN | 110266545 A | 9/2019 |
| CN | 110768836 A | 2/2020 |

(Continued)

OTHER PUBLICATIONS

International Search Report with English translation mailed on Apr. 21, 2021 in PCT/CN2020/106509 filed on Aug. 30, 2020 (4 pages).

(Continued)

*Primary Examiner* — Duc C Ho
(74) *Attorney, Agent, or Firm* — Oblon, McClelland, Maier & Neustadt, L.L.P.

(57) ABSTRACT

The present disclosure relates to a service slice activation method and service slice activation apparatus, and a storage medium. The service slice activation method can include obtaining first information, the first information including an encryption identifier corresponding to an application identifier, and, on the basis of the first information, activating a slice configuration for an application associated with the application identifier.

20 Claims, 7 Drawing Sheets

S11

Obtain first information, the first information including an encryption identity corresponding to an application identity

S12

Activate a slice configuration for an application associated with the application identity based on the first information

(56) References Cited

U.S. PATENT DOCUMENTS

2020/0351756 A1* 11/2020 Jager .................... H04W 48/10

FOREIGN PATENT DOCUMENTS

| CN | 111165025 A | 5/2020 |
|---|---|---|
| WO | WO 2017/173259 A1 | 10/2017 |
| WO | WO 2018/235836 A1 | 12/2018 |
| WO | WO 2019/004929 A2 | 1/2019 |

OTHER PUBLICATIONS

Chinese Office Action with English translation dated Sep. 9, 2022 in Chinese Application 202080001852.6 (17 pages).
Qualcomm Inc., "Clarifications and Initial evaluation for Solution 7", 3GPP TSG-WG2 Meeting #127, S2-185091, May 22, 2018, 17 pages.
AT&T et al., "Use of AppID and OSID in URSP" SA WG2 Meeting #S2-137, S2-2001834, Feb. 14, 2020, 5 pages.
S1-174122, "FS_BMNS 3rd party encryption" 3GPP TSG-SA WG1 Meeting #80, Nov. 27-Dec. 1, 2017, 3 pages.
Combined Chinese Office Action and Search Report issued May 27, 2023, in corresponding Chinese Patent Application No. 202080001852.6 (with English Translation of Category of Cited Documents), 9 pages.
Chinese Office Action mailed Nov. 23, 2023 in corresponding Chinese Application No. 202080001852.6 (with English translation), 7 pages.

* cited by examiner

SERVICE SLICE ACTIVATION METHOD AND SERVICE SLICE ACTIVATION APPARATUS, AND STORAGE MEDIUM

CROSS-REFERENCE

The present application is a U.S. National Stage of International Application No. PCT/CN2020/106509, filed on Aug. 3, 2020, the contents of which are incorporated herein by reference in their entireties for all purposes.

BACKGROUND OF THE INVENTION

Field of the Invention

The present disclosure relates to the field of communication technologies, and in particular, to a method for activating a service slice, an apparatus for activating a service slice, and a storage medium.

Description Of Related Art

Network slicing (NS) technologies have been introduced in the fifth generation (5G) mobile communication systems. The NS technologies allow networks (core networks and radio access networks) to be divided into a plurality of slices, and different services are transmitted in different slices without interfering with each other.

In the related arts, the establishment of the slices may be for services such as a Data Network Name (DNN), an IP triplet, and an Application Identity (APP ID), and slices at an application identity level can provide targeted services for Applications (APPs), attracting users and creating value.

SUMMARY OF THE INVENTION

The present disclosure provides a method for activating a service slice, an apparatus for activating a service slice, and a storage medium.

According to a first aspect of embodiments of the present disclosure, there is provided a method for activating a service slice, including obtaining first information, wherein the first information includes an encryption identity corresponding to an application identity; and activating a slice configuration for an application associated with the application identity based on the first information.

According to a second aspect of embodiments of the present disclosure, there is provided a method for activating a service slice, including reporting first information, wherein the first information is used to activate a slice configuration for an application associated with an application identity, and includes an encryption identity corresponding to the application identity.

According to a third aspect of embodiments of the present disclosure, there is provided an apparatus for activating a service slice, including an obtaining unit, configured to obtain first information, wherein the first information includes an encryption identity corresponding to an application identity, and a processing unit, configured to activate a slice configuration for an application associated with the application identity based on the first information.

According to a fourth aspect of embodiments of the present disclosure, there is provided an apparatus for activating a service slice, including: a sending unit, configured to report first information, wherein the first information is used to activate a slice configuration for an application associated with an application identity, and includes an encryption identity corresponding to the application identity.

According to a fifth aspect of embodiments of the present disclosure, there is provided an apparatus for activating a service slice, including a processor and a memory configured to store instructions executable by the processor. The processor is configured to perform the method for activating the service slice according to the first aspect or any implementation of the first aspect.

According to a sixth aspect of embodiments of the present disclosure, there is provided an apparatus for activating a service slice, including a processor and a memory configured to store instructions executable by the processor. The processor is configured to perform the method for activating the service slice according to the second aspect or any implementation of the second aspect.

According to a seventh aspect of embodiments of the present disclosure, there is provided a non-transitory computer readable storage medium, wherein when instructions in the storage medium are executed by a processor of a network device, the network device is caused to perform the method for activating the service slice according to the first aspect or any implementation of the first aspect.

According to an eighth aspect of embodiments of the present disclosure, there is provided a non-transitory computer readable storage medium, wherein when instructions in the storage medium are executed by a processor of a mobile terminal, the mobile terminal is caused to perform the method for activating the service slice according to the second aspect or any implementation of the second aspect.

It should be noted that the above general description and the following detailed description are merely exemplary and explanatory and should not be construed as limiting of the disclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
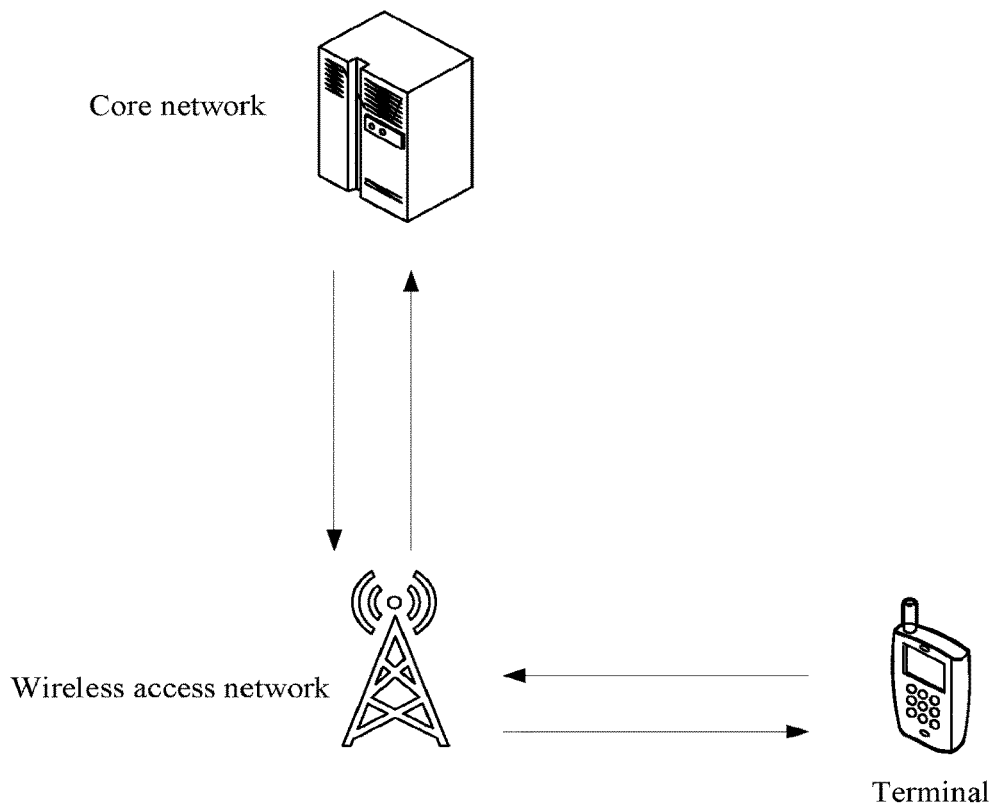
FIG. 1 is an architectural diagram showing a wireless communication system according to an embodiment of the present disclosure.

Referring now to the drawings, wherein like reference numerals designate identical or corresponding parts throughout the several views.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the present disclosure. Instead, they are merely examples of devices and methods consistent with aspects related to the present disclosure as recited in the appended claims.

The present disclosure provides a method for activating a service slice, which can be applied to a wireless communication system shown in FIG. 1. As shown in FIG. 1, a mobile station accesses a wireless access network via a wireless access network network device such as a base station, and the wireless access network network device and a core network network device complete data backhaul and data forward transfer to perform various communication services.

It can be understood that the wireless communication system is a network that provides wireless communication functions. The wireless communication system may employ different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), or Carrier Sense Multiple Access with Collision Avoidance. Depending on the capacity, rate, and delay of different networks, the networks can be classified as a 2G (second generation) network, a 3G network, a 4G network, or a future evolved network such as a 5G network, which can also be called a New Radio (NR) network. For ease of description, the present disclosure will sometimes refer to the wireless communication network as simply network or system. The network in the present disclosure may include a Radio Access Network (RAN) and a Core Network (CN). The network includes a network device, and the network device may be, for example, a radio access network node, a core network device, and the like, and the radio access network node may also be called a base station. The network can provide network services for a terminal through the network device, and different operators can provide different network services for the terminal, which can also be understood that different operators correspond to different operator networks.

The Mobile Station (MS) may also be referred to as User Equipment (UE), Terminal, Mobile Terminal (MT), etc. and is a device that provides voice and/or data connectivity to a user. For example, the terminal may be a handheld device with a wireless connection function, or a vehicle-mounted device, etc. Currently, some examples of the terminal are: mobile phone, Pocket Personal Computer (PPC), pocket PC, Personal Digital Assistant (PDA), laptop, tablet, a wearable device, or a vehicle-mounted device, etc.

Figure 2:
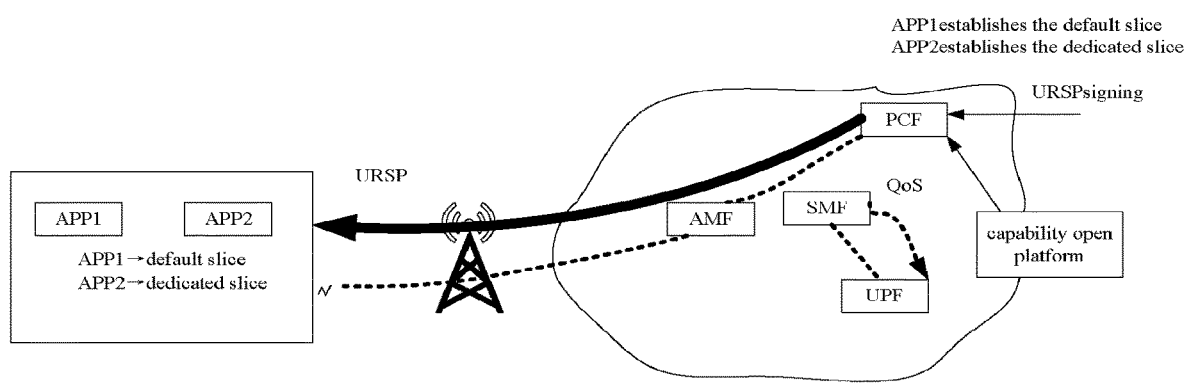
FIG. 2 is a schematic diagram showing a slice processing for an application identity service according to an embodiment of the present disclosure.

The service slice activation provided by embodiments of the present disclosure is applied to a communication network that introduces network slicing technologies. The application of the network slicing technologies can make different services transmitted in different slices without interfering with each other. Embodiments of the present disclosure provide slice activation for a service corresponding to an application identity, and different slices are established for different APPs. FIG. 2 shows a schematic diagram of a slice processing for an application identity service. Referring to FIG. 2, different slices are established for APP1 and APP2 hosted on terminal 1, a default slice is established for APP1, and a dedicated slice is established for APP2. APP1 and APP2 perform service slice transmission based on different service identity rules (such as UE Route Selection Policy (URSP)) and Quality of Service (Qos), and targeted services can be provided for different APPs.

However, there may be a security problem in the use of application identity, that is, it is easy for the application identity to be used by fraud (a non-paid APP uses a paid ID, that is, hijack), since this ID is currently in plaintext in standards. And the most important thing is, in the post-mobile Internet era, mobile terminals do not only exist as a communication network pipeline (one end of the pipeline), and many terminal device manufacturers are also involved in the Internet of Things services, so there is also a need for managing the application identity.

In view of this, embodiments of the present disclosure provide a method for activating a service slice. In the method for activating the service slice, a terminal sends an encryption identity corresponding to an application identity to a network side. A network device obtains the encryption identity corresponding to the application identity, and performs service slice activation of the application identity based on the encryption identity, which can improve the security of the service slice activation of the application identity.

Figure 3:
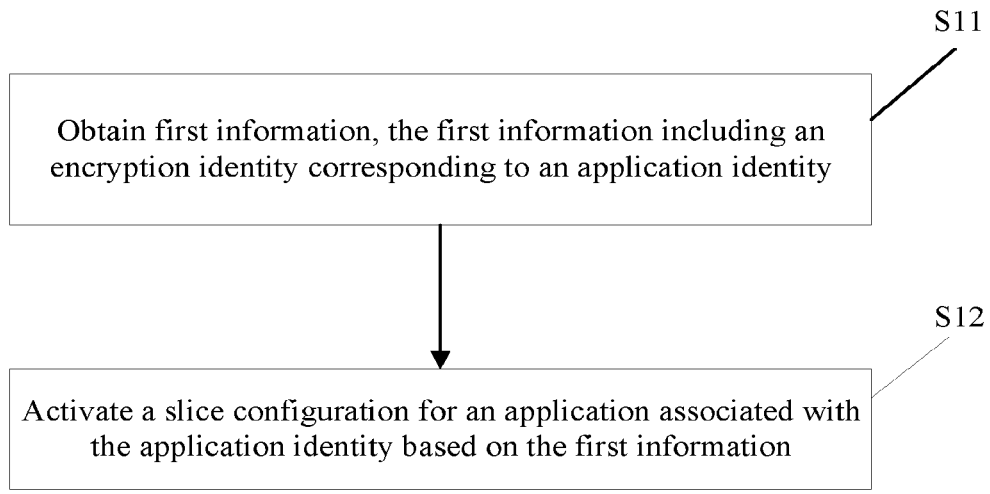
FIG. 3 is a flowchart showing a method for activating a service slice according to an embodiment of the present disclosure.

FIG. 3 is a flowchart showing a method for activating a service slice according to an embodiment of the present disclosure. As shown in FIG. 3, the method for activating the service slice is applied to a network device and includes the following steps S11 to S12.

In the step S11, first information is obtained, and the first information includes an encryption identity corresponding to an application identity.

In the step S12, based on the first information, a slice configuration for an application associated with the application identity is activated.

In embodiments of the present disclosure, the encryption identity corresponding to the application identity may be an encryption identity generated by a communication terminal organization for the application hosted on its own device and corresponding to the application identity. For example, the communication terminal organization can sign a cooperation agreement with an application operator that has a contract with itself, so that when an application of the application operator is hosted on the terminal, it can use a network slicing service dedicated to the application and provided by a network operator, thereby improving network fluency of the application. Network slicing services for different communication terminal organizations may be different. In order to ensure that these network slicing services are not spoofed by malicious third parties, the communication terminal organization can encrypt application identities of applications of these application operators to obtain encryption identities. Therefore, when the terminal sends a slice registration request to the network operator, it can send the encryption identity to the network operator. Based on the encryption identity, the network operator obtains the application identity corresponding to the encryption identity through decryption or a mapping relationship, etc., thereby activating the slice configuration for the application requested by the terminal, and notifies the terminal that the slice configuration for the application has been activated. The communication terminal organization can be a single communication terminal manufacturer, a communication terminal manufacturer alliance composed of a plurality of communication terminal manufacturers, or a third-party communication terminal alliance composed of a plurality of terminals (for example, a group formed by terminal customers themselves, a terminal group composed of a plurality of terminals held by all employees of a certain company, or a terminal group composed of a plurality of terminals held by members of a certain group, etc.), etc.

In an implementation, the encryption identity corresponding to the application identity may be a plurality of encryption identities corresponding to a plurality of APPs hosted on a device, and the network device may obtain the plurality of encrypted identities corresponding to the plurality of application identities. Therefore, based on the plurality of encrypted identities, the network device can obtain the plurality of application identities corresponding to the plurality of encrypted identities, and can also activate corresponding slice configurations for the plurality of application identities. Through the above manner, signaling overhead is saved.

In an implementation, the encryption identity corresponding to the application identity may be determined through a preset correspondence between the application identity and the encryption identity. For example, the correspondence may be characterized by a correspondence table including a mapping relationship between the application identity and the encryption identity. The network device may receive the correspondence table, and map the received encryption identity to the application identity based on the correspondence table, so as to learn the application identity of the application that initiates the slice registration request. The communication terminal organization can send the correspondence table to the network device of the network operator, so that the network device can determine the application identity based on the correspondence table when receiving the encryption identity.

In an optional implementation, the correspondence between the application identity and the encryption identity may be one-to-one, that is, one application identity may be uniquely mapped to one encryption identity. In this way, the network operator can configure one dedicated network slicing for each application. As long as the network operator determines the application identity corresponding to the encryption identity according to the encryption identity received from the terminal, the network operator activates the corresponding slice configuration for the application identity. In another optional implementation, the correspondence between the application identity and the encryption identity may be one-to-many, that is, one application identity may be mapped to a plurality of encryption identities. In this way, different encryption identities generated by different types of devices or different types of systems of the same communication terminal organization or devices or systems of different communication terminal organizations can be mapped to the same application identity, so that a public slice configuration for the application can be activated on the network device on the network operator side.

In another implementation, the encryption identity corresponding to the application identity may be determined by encrypting the application identity using a preset encryption rule. For example, the network operator and the communication terminal organization predetermine the preset encryption rule, such as a MD5 encryption algorithm, a symmetric encryption algorithm, an asymmetric encryption algorithm, and the like. The encryption rule may include an encryption key, a sequence generation rule, an encryption function, and the like.

In embodiments of the present disclosure, an encrypted application identity, that is, the encryption identity, can be obtained by using the preset encryption rule to encrypt the application identity. The network device of the operator is notified to activate the slice configuration for the application identity through the encryption identity, which can improve the security of slice resource allocation.

In addition, those skilled in the art can understand that the one-to-one or one-to-many mapping relationship between the application identity and the encryption identity as described above can also be realized through a specific preset encryption rule, which will not be repeated here.

In an implementation, the encryption identity corresponding to the application identity is determined by encrypting the application identity and/or a terminal identity, and the terminal identity is associated with a terminal hosting the application. For example, the encryption identity may be obtained by individually encrypting the application identity or the terminal identity using the preset encryption rule, or may be obtained by encrypting both the application identity and the terminal identity using the preset encryption rule.

In an embodiment, the terminal identity may be used to identify the communication terminal organization to which the terminal belongs, so as to obtain the slice service corresponding to the communication terminal organization. The terminal identity may include a device identity associated with the terminal hosting the application and/or a system identity associated with a system hosting the application, and the terminal identity may be predefined. For example, the device identity may be a device identification code of the terminal hosting the application predefined by the communication terminal organization, or a uniform device identification code of a certain type of devices produced or held by the communication terminal organization. For another example, the system identity may be a system identification code of an operating system hosting the application, such as a system identification code of MIUI or IOS.

In an optional implementation, when the encryption identity is obtained by encrypting only the terminal identity, the slice registration request carrying the encryption identity is a slice configuration activation request for the terminal, terminal type, and operating system indicated by the terminal identity. That is, the slice configuration is configured by the network operator for a certain type of terminals or a certain type of terminal systems.

In another implementation, in a case where both the application identity and the terminal identity are encrypted by using the preset encryption rule, the terminal identity and the application identity can be, for example, simply concatenated to form a new identity sequence. The new identity sequence is encrypted according to the preset encryption rule to obtain the encryption identity. Here, a combination manner of the terminal identity and the application identity is not limited to concatenation, and those skilled in the art can recognize that there are other combination manners for identity sequences, which will not be repeated here. Likewise, the combination manner is also known in advance by the network operator and the communication terminal organization, so that the security of the encryption identity can be further ensured.

In an implementation, different communication terminal organizations may configure different encryption identities for the same application identity according to their own different services and configuration requirements.

In embodiments of the present disclosure, the network device may obtain and store the correspondence between the application identity and the encryption identity, and/or the encryption rule for the application identity. The network device of the operator involved in embodiments of the present disclosure may be, on the one hand, a network element of the core network of the operator, such as a network element device that currently manages the application identity, that is, a Policy Control Function (PCF), or may be, on the other hand, a management server set up by the core network of the operator and dedicated to storing the correspondence between the application identity and the encryption identity and/or the encryption rule for the application identity. When the network element of the core network of the operator needs to determine the application identity based on the received encryption identity, it can send an ID query request to the management server, and the ID query request can include the encryption identity. A query process will be specifically introduced in the following description of FIGS. 4-9.

In an implementation, the communication terminal organization may regularly or irregularly update the application identity, the encryption identity, the correspondence between the application identity and the encryption identity and/or the encryption rule that are configured by itself. The communication terminal organization can send update information to the network operator through its own network server or terminal device to update information associated with the application identity and the encryption identity held at the network operator.

Figure 4:
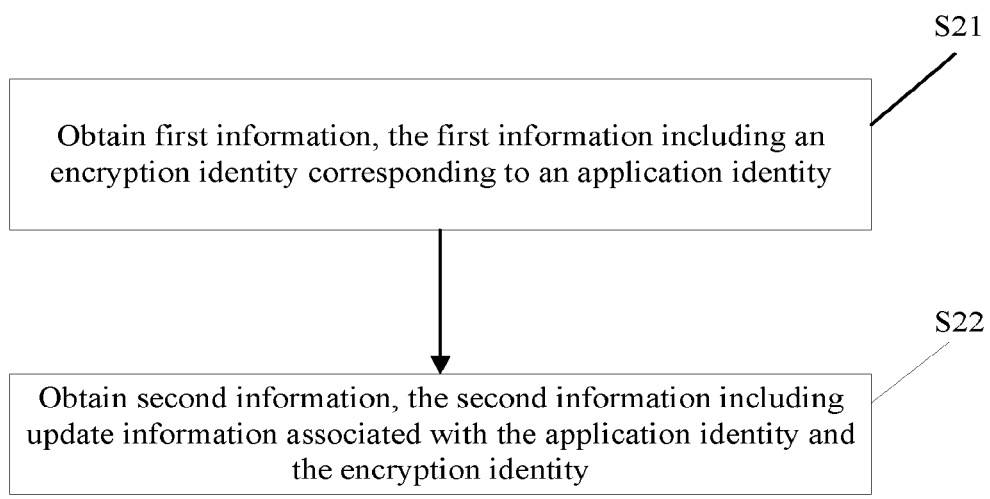
FIG. 4 is a flowchart showing a method for activating a service slice according to an embodiment of the present disclosure.

FIG. 4 is a flowchart showing a method for activating a service slice according to an embodiment of the present disclosure. As shown in FIG. 4, the method for activating the service slice is applied to a network device and includes the following steps S21 to S22.

In the step S21, first information is obtained, and the first information includes an encryption identity corresponding to an application identity.

In the step S22, second information is obtained, and the second information includes update information associated with the application identity and the encryption identity.

In embodiments of the present disclosure, the update information associated with the application identity and the encryption identity may be update information for the application identity, the encryption identity, the correspondence between the application identity and the encryption identity and/or the encryption rule encrypting the application identity that are agreed by the communication terminal organization and the network operator or separately configured. On the one hand, the update information may indicate an initial configuration for the application identity, the encryption identity, the correspondence between the application identity and the encryption identity and/or the encryption rule encrypting the application identity. In other words, the network operator in an initial state does not have any configuration information for the application identity, the encryption identity, the correspondence between the application identity and the encryption identity and/or the encryption rule encrypting the application identity, establishes a relationship between the application identity and the encryption identity by receiving the update information, and can obtain the application identity according to the received encryption identity. On the other hand, the update information may refer to update for the application identity, the encryption identity, the correspondence between the application identity and the encryption identity, and/or the encryption rule encrypting the application identity. The update involved in embodiments of the present disclosure may include a change to the application identity used by the application, a change to the encryption identity corresponding to the application identity, addition or reduction of the application identity, addition or reduction of the encryption identity, change to the correspondence between the application identity and the encryption identity and/or change to the encryption rule, etc.

In an embodiment, the update information itself can also be encrypted, so that the update information is transmitted between the communication terminal organization and the network operator in an encrypted manner, so as to ensure that the update information will not be stolen by a malicious third party to cause serious losses.

In embodiments of the present disclosure, the network device may obtain the first information and/or the second information through a slice registration process. In an example, the terminal carries the first information and/or the second information in the slice registration request when initiating a slice correspondence process, and the network device obtains the first information and/or the second information through the slice registration request. In another implementation, the second information may be sent to the network operator through a periodic or aperiodic independent system message or dedicated signaling.

In embodiments of the present disclosure, when the network device is the core network device of the operator, the core network device itself may store the application identity, the encryption identity, the correspondence between the application identity and the encryption identity and/or the encryption rule encrypting the application identity, or the core network device may also retrieve the application identity, the encryption identity, the correspondence between the application identity and the encryption identity and/or the encryption rule encrypting the application identity from the encryption identity management server.

In embodiments of the present disclosure, the network device may determine the application identity corresponding to the encryption identity based on the obtained encryption identity, and the correspondence between the application identity and the encryption identity and/or the encryption rule encrypting the application identity. For example, on the one hand, the core network device determines the application identity corresponding to the encryption identity through the correspondence between the application identity and the encryption identity stored by itself, or the core network device retrieves the correspondence between the application identity and the encryption identity from the encryption identity management server and determines the application identity corresponding to the encryption identity. On the other hand, the core network device can, for example, decrypt the encryption identity through the encryption rule stored by itself to obtain the corresponding application identity, or the core network device retrieves the encryption rule from the encryption identity management server and decrypt the encryption identity to obtain the corresponding application identity. In an optional implementation, the above two steps may be performed at the encryption identity management server, and the core network device only sends the encryption identity to the encryption identity management server, and receives the returned application identity from the encryption identity management server.

In embodiments of the present disclosure, after obtaining the encryption identity, the network device sends the application identity corresponding to the obtained encryption identity and/or a slice configuration parameter associated with the obtained encryption identity, so that the device executing the application corresponding to the application identity can perform service processing associated with the application based on a slice corresponding to the application identity.

The network device sends the application identity corresponding to the obtained encryption identity. The application identity may be sent by being carried in the existing information, or through the dedicated signaling. In an example, the network device may send the application identity corresponding to the encryption identity to the device hosting the application through a slice registration request response message (e.g., a slice registration success message).

Figure 5:
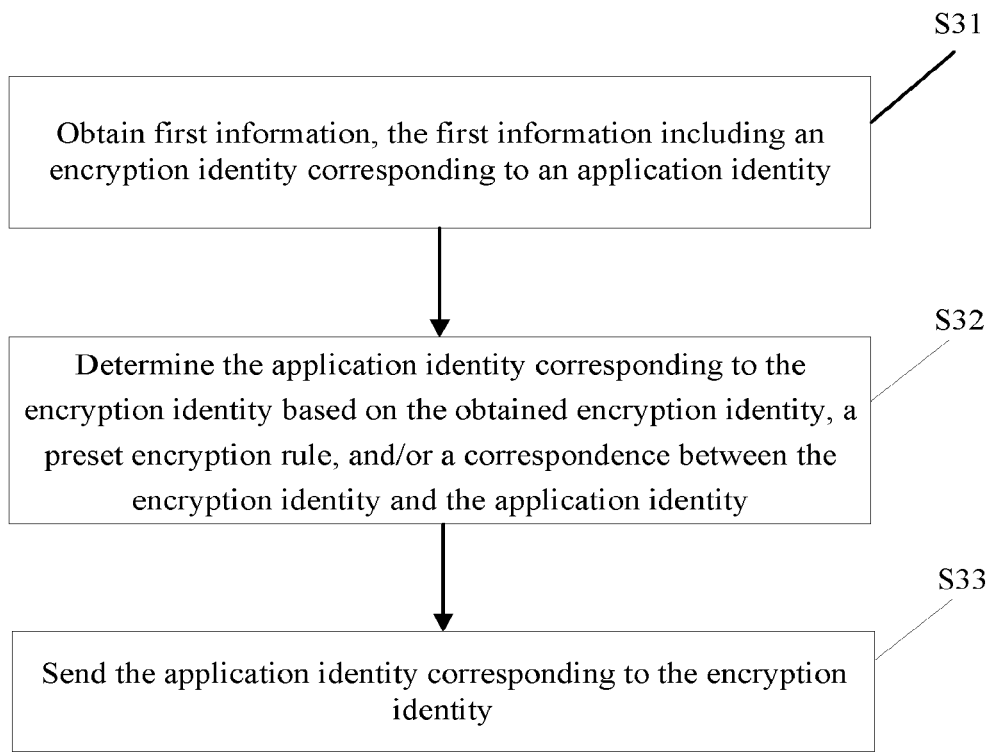
FIG. 5 is a flowchart showing a method for activating a service slice according to an embodiment of the present disclosure.

FIG. 5 is a flowchart showing a method for activating a service slice according to an embodiment of the present disclosure. As shown in FIG. 5, the method for activating the service slice is applied to a network device and includes the following steps S31 to S33.

In the step S31, first information is obtained, and the first information includes an encryption identity corresponding to an application identity.

In the step S32, the application identity corresponding to the encryption identity is determined based on the obtained encryption identity, a preset encryption rule and/or a correspondence between the encryption identity and the application identity.

In the step S33, the application identity corresponding to the encryption identity is sent.

In embodiments of the present disclosure, the application identity corresponding to the encryption identity may be an original non-encrypted universal application identity.

In combination with the method for activating the service slice provided in the above embodiments, the network device can obtain the encryption identity corresponding to the application identity, and can confirm the original application identity based on the encryption identity and activate the corresponding slice configuration for the original application identity. In this way, the security of the slice activation can be improved, which in turn enables the communication terminal organization to safely use corresponding matched network slices for different applications.

The application identity, the encryption identity, the correspondence between the application identity and the encryption identity, and/or the encryption rule encrypting the application identity involved in embodiments of the present disclosure may be determined and reported to the operator network by the communication terminal organization. In an embodiment, the application identity corresponding to the encryption identity may be sent through the slice registration request response message (e.g., the slice registration success message).

Figure 6:
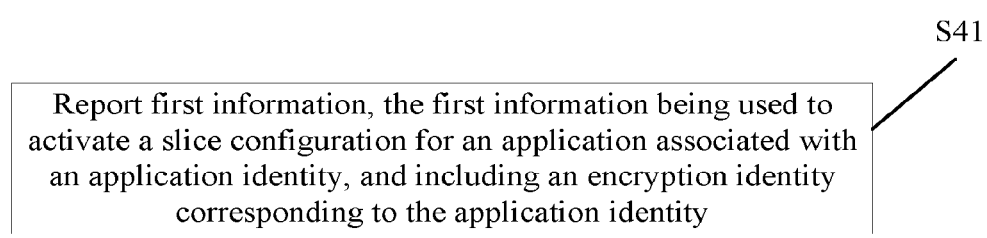
FIG. 6 is a flowchart showing a method for activating a service slice according to an embodiment of the present disclosure.

FIG. 6 is a flowchart showing a method for activating a service slice according to an embodiment of the present disclosure. As shown in FIG. 6, the method for activating the service slice is applied to a device hosting an APP, which may be, for example, a terminal, and the method includes the following step S41.

In the step S41, first information is reported, and the first information is used to activate a slice configuration for an application associated with an application identity, and includes an encryption identity corresponding to the application identity.

In embodiments of the present disclosure, the encryption identity corresponding to the application identity may be an encryption identity generated by a communication terminal organization for the application hosted on a device produced by itself and corresponding to the application identity. For example, the communication terminal organization can sign a cooperation agreement with an application operator that has a contract with itself, so that when an application of the application operator is hosted on the terminal, it can use a network slicing service dedicated to the application and provided by a network operator, thereby improving network fluency of the application. In order to ensure that these network slicing services are not spoofed by malicious third parties, the communication terminal organization can encrypt application identities of applications of these application operators to obtain encryption identities. Therefore, when the terminal sends a slice registration request to the network operator, it can send the encryption identity to the network operator. Based on the encryption identity, the network operator obtains the application identity corresponding to the encryption identity through decryption or a mapping relationship, etc., thereby activating the slice configuration for the application requested by the terminal, and notifies the terminal that the slice configuration for the application has been activated.

In an implementation, the encryption identity corresponding to the application identity may be a plurality of encryption identities corresponding to a plurality of APPs hosted on a device, and the network device may obtain the plurality of encrypted identities corresponding to the plurality of application identities. Therefore, based on the plurality of encrypted identities, the network device can obtain the plurality of application identities corresponding to the plurality of encrypted identities, and can also activate corresponding slice configurations for the plurality of application identities. Through the above manner, signaling overhead is saved.

In an implementation, the encryption identity corresponding to the application identity may be determined through a preset correspondence between the application identity and the encryption identity. For example, the correspondence may be characterized by a correspondence table including a mapping relationship between the application identity and the encryption identity. The network device may receive the correspondence table, and map the received encryption identity to the application identity based on the correspondence table, so as to learn the application identity of the application that initiates the slice registration request. The communication terminal organization can send the correspondence table to the network device of the network operator, so that the network device can determine the application identity based on the correspondence table when receiving the encryption identity.

In an optional implementation, the correspondence between the application identity and the encryption identity may be one-to-one, that is, one application identity may be uniquely mapped to one encryption identity. In this way, the network operator can configure one dedicated network slicing for each application. As long as the network operator determines the application identity corresponding to the encryption identity according to the encryption identity received from the terminal, the network operator activates the corresponding slice configuration for the application identity. In another optional implementation, the correspondence between the application identity and the encryption identity may be one-to-many, that is, one application identity may be mapped to a plurality of encryption identities. In this way, different encryption identities generated by different types of devices or different types of systems of the same communication terminal organization or devices or systems of different communication terminal organizations can be mapped to the same application identity, so that a public slice configuration for the application can be activated on the network device on the network operator side.

In another implementation, the encryption identity corresponding to the application identity may be determined by encrypting the application identity using a preset encryption rule. For example, the network operator and the communication terminal organization predetermine the preset encryption rule, such as a MD5 encryption algorithm, a symmetric encryption algorithm, an asymmetric encryption algorithm, and the like. The encryption rule may include an encryption key, a sequence generation rule, an encryption function, and the like.

In embodiments of the present disclosure, an encrypted application identity, that is, the encryption identity, can be obtained by using the preset encryption rule to encrypt the application identity. The network device of the operator is notified to activate the slice configuration for the application identity through the encryption identity, which can improve the security of slice resource allocation.

In addition, those skilled in the art can understand that the one-to-one or one-to-many mapping relationship between the application identity and the encryption identity as described above can also be realized through a specific preset encryption rule, which will not be repeated here.

In an implementation, the encryption identity corresponding to the application identity is determined by encrypting the application identity and/or a terminal identity, and the terminal identity is associated with a terminal hosting the application. For example, the encryption identity may be obtained by individually encrypting the application identity or the terminal identity using the preset encryption rule, or may be obtained by encrypting both the application identity and the terminal identity using the preset encryption rule.

In an embodiment, the terminal identity may include a device identity associated with the terminal hosting the application and/or a system identity associated with a system hosting the application, and the terminal identity may be predefined. For example, the device identity may be a device identification code of the terminal hosting the application, such as IMEI, MEID or the like, or a uniform device identification code of a certain type of devices produced by the communication terminal organization. For another example, the system identity may be a system identification code of an operating system hosting the application, such as a system identification code of MIUI or IOS.

In an optional implementation, when the encryption identity is obtained by encrypting only the terminal identity, the slice registration request carrying the encryption identity is a slice configuration activation request for the terminal, terminal type, and operating system indicated by the terminal identity. That is, the slice configuration is configured by the network operator for a certain type of terminals or a certain type of terminal systems.

In another implementation, in a case where both the application identity and the terminal identity are encrypted by using the preset encryption rule, the terminal identity and the application identity can be, for example, simply concatenated to form a new identity sequence. The new identity sequence is encrypted according to the preset encryption rule to obtain the encryption identity. Here, a combination manner of the terminal identity and the application identity is not limited to concatenation, and those skilled in the art can recognize that there are other combination manners for identity sequences, which will not be repeated here. Likewise, the combination manner is also known in advance by the network operator and the communication terminal organization, so that the security of the encryption identity can be further ensured.

In an implementation, different communication terminal organizations may configure different encryption identities for the same application identity according to their own different services and configuration requirements.

In embodiments of the present disclosure, the terminal may report the correspondence between the application identity and the encryption identity, and/or the encryption rule for the application identity to the network device. In an implementation, the communication terminal organization may regularly or irregularly update the application identity, the encryption identity, the correspondence between the application identity and the encryption identity and/or the encryption rule that are configured by itself. The communication terminal organization can send update information to the network operator through its own network server or terminal device to update information associated with the application identity and the encryption identity held at the network operator.

Figure 7:
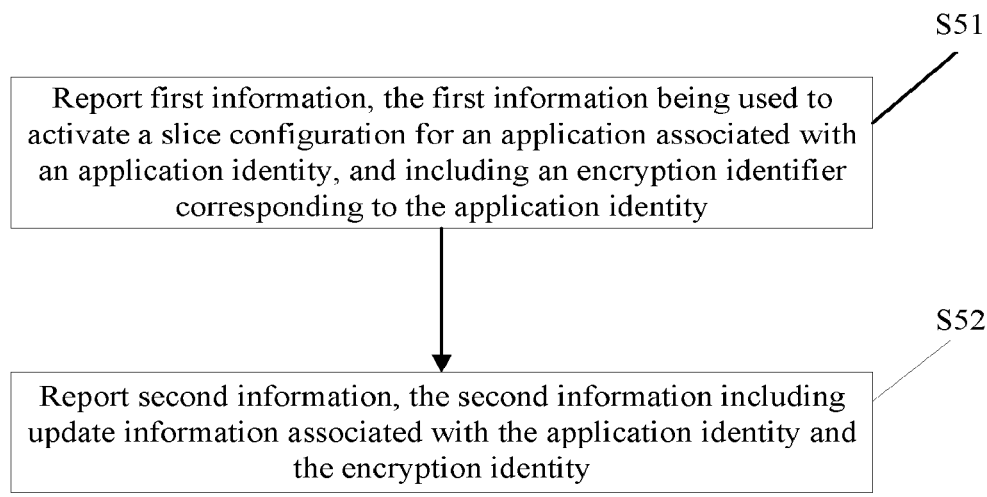
FIG. 7 is a flowchart showing a method for activating a service slice according to an embodiment of the present disclosure.

FIG. 7 is a flowchart showing a method for activating a service slice according to an embodiment of the present disclosure. As shown in FIG. 7, the method for activating the service slice is applied to a terminal and includes the following steps S51 to S52.

In the step S51, first information is reported, and the first information is used to activate a slice configuration for an application associated with an application identity, and includes an encryption identity corresponding to the application identity.

In the step S52, second information is reported, and the second information includes update information associated with the application identity and the encryption identity.

In embodiments of the present disclosure, the update information associated with the application identity and the encryption identity may be update information for the application identity, the encryption identity, the correspondence between the application identity and the encryption identity and/or the encryption rule encrypting the application identity that are agreed by the communication terminal organization and the network operator or separately configured. On the one hand, the update information may indicate an initial configuration for the application identity, the encryption identity, the correspondence between the application identity and the encryption identity and/or the encryption rule encrypting the application identity. In other words, the network operator in an initial state does not have any configuration information for the application identity, the encryption identity, the correspondence between the application identity and the encryption identity and/or the encryption rule encrypting the application identity, establishes a relationship between the application identity and the encryption identity by receiving the update information, and can obtain the application identity according to the received encryption identity. On the other hand, the update information may refer to update for the application identity, the encryption identity, the correspondence between the application identity and the encryption identity, and/or the encryption rule encrypting the application identity. The update involved in embodiments of the present disclosure may include addition or reduction of the application identity, addition or reduction of the encryption identity, change to the correspondence between the application identity and the encryption identity and/or change to the encryption rule, etc.

In an embodiment, the update information itself can also be encrypted, so that the update information is transmitted between the communication terminal organization and the network operator in an encrypted manner, so as to ensure that the update information will not be stolen by a malicious third party to cause serious losses.

In embodiments of the present disclosure, the device hosting the APP may report the first information and/or the second information through a slice registration process. In an example, the terminal carries the first information and/or the second information in the slice registration request when initiating a slice correspondence process, and the device hosting the APP reports the first information and/or the second information through the slice registration request. In another implementation, the second information may be sent to the network operator through a periodic or aperiodic independent system message or dedicated signaling.

Figure 8:
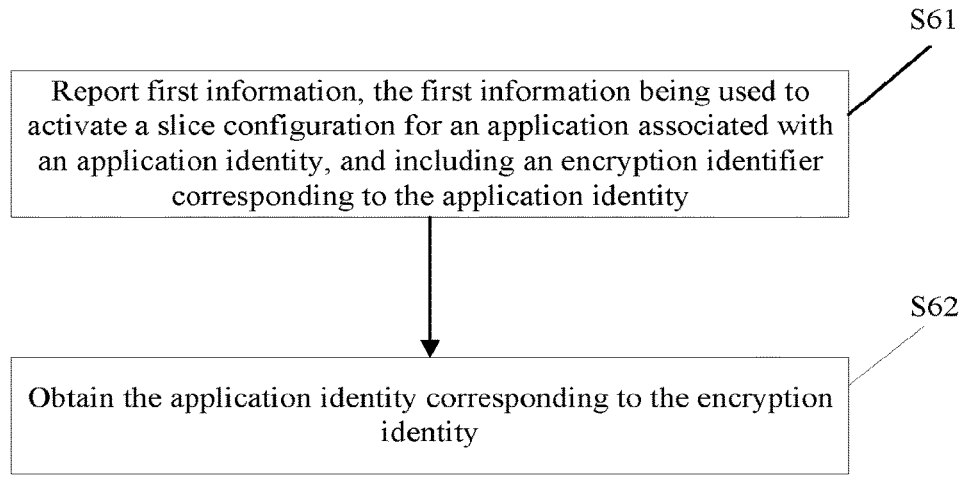
FIG. 8 is a flowchart showing a method for activating a service slice according to an embodiment of the present disclosure.

FIG. 8 is a flowchart showing a method for activating a service slice according to an embodiment of the present disclosure. As shown in FIG. 8, the method for activating the service slice is applied to a device hosting an APP, such as a terminal, and includes the following steps S61 to S62.

In the step S61, first information is reported, and the first information is used to activate a slice configuration for an application associated with an application identity, and includes an encryption identity corresponding to the application identity.

In the step S62, the application identity corresponding to the encryption identity is obtained. The application identity corresponding to the encryption identity may be determined by the network device based on the obtained encryption identity, the preset encryption rule and/or the correspondence between the encryption identity and the application identity.

In embodiments of the present disclosure, the application identity corresponding to the encryption identity can be understood as an original non-encrypted universal application identity.

In combination with the method for activating the service slice provided in the above embodiments, the terminal can report the encryption identity corresponding to the application identity, so that the subsequent slice activation process can realize the confirmation of the original application identity based on the encryption identity and activate the corresponding slice configuration for the original application identity. In this way, the security of the slice activation can be improved, which in turn enables the communication terminal organization to safely use corresponding matched network slices for different applications.

In embodiments of the present disclosure, the method for activating the service slice involved in the foregoing embodiments will be described below in combination with practical applications, and the description is taken the device hosting the APP as the terminal, the newly added encryption identity management server and the core network of the operator as the network device as an example. It should be understood that respective specific technical features listed in the embodiments are only for the purpose of illustration, and do not have any limitation on the scope disclosed in the present disclosure. For example, the following correspondence table between the encryption identity and the application identity can also be replaced by the encryption rule. For example, the encryption rule may include an encryption key, a sequence generation rule, an encryption function, and the like.

Figure 9:
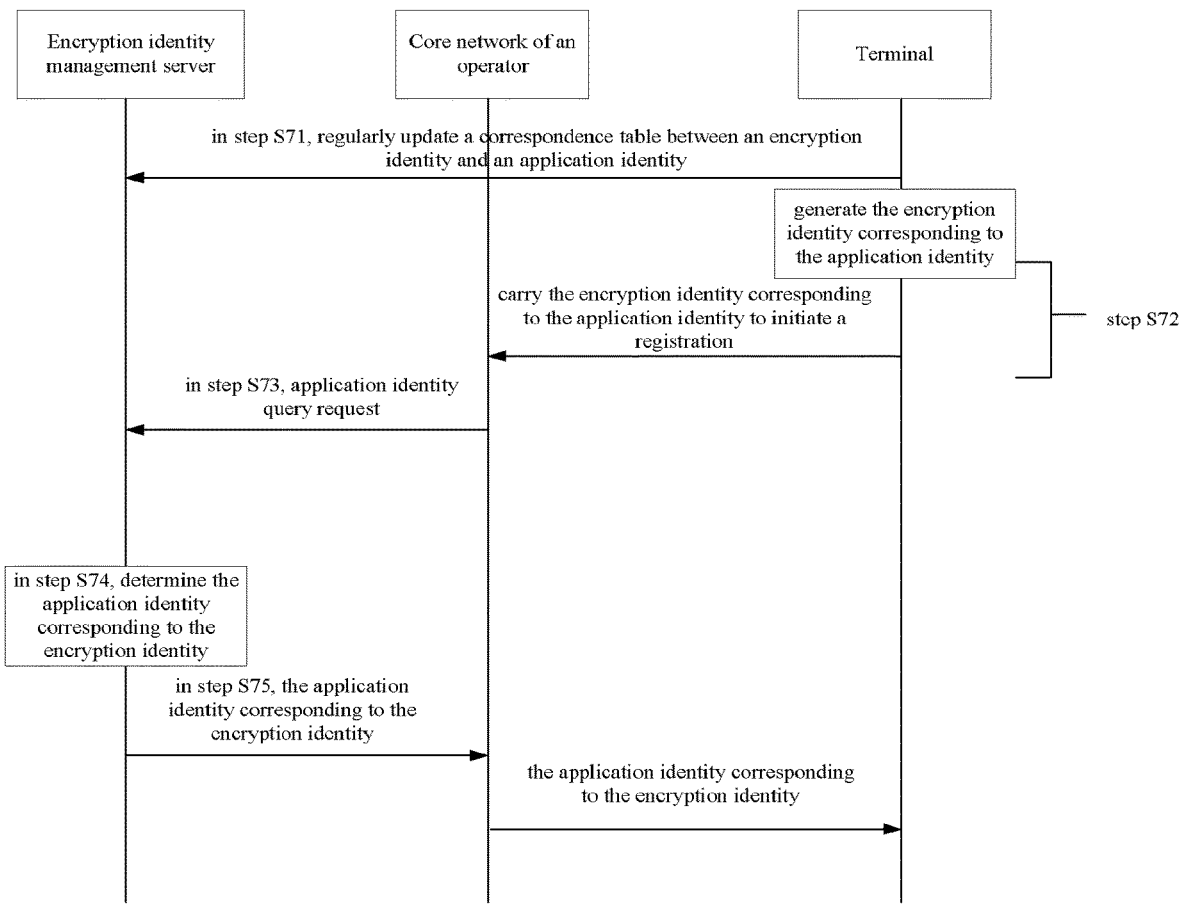
FIG. 9 is a flowchart showing a method for activating a service slice according to an embodiment of the present disclosure.

FIG. 9 is a flowchart showing a method for activating a service slice according to an embodiment of the present disclosure, and as shown in FIG. 9, the method includes the following steps S71 to S75.

In the step S71, the terminal regularly updates the correspondence table between the encryption identity and the application identity to the core network of the operator (or the encryption identity management server).

The regularly updating the correspondence table can also be understood as sending an initial correspondence table between the encryption identity and the application identity.

The correspondence table between the encryption identity and the application identity can be encrypted, so that the correspondence table is transmitted between the communication terminal organization and the network operator in an encrypted manner, so as to ensure that the correspondence table will not be stolen by the malicious third party to cause serious losses.

In the step S72, the terminal generates the encryption identity corresponding to the application identity based on the correspondence table between the encryption identity and the application identity. When the terminal is powered on or starts the application corresponding to the application identity, the terminal will initiate a slice application process. In this case, if there is a related setting between the application identity and the encryption identity, the terminal carries the corresponding encrypted application identity to initiate the registration.

It can be understood that if no relevant setting between the application identity and the encryption identity exists on the terminal side, the terminal carries a default value or even a null value to initiate the registration.

If the terminal carries the default value or the null value to initiate the registration, the operator network can configure the encrypted application identity for the terminal.

In the optional step S73, the core network of the operator sends an application identity query request to the encryption identity management server, so as to query and obtain the universal application identity based on the encryption identity.

In the optional step S74, the encryption identity management server determines the application identity (the unencrypted universal application identity) corresponding to the encryption identity based on the obtained encryption identity and the correspondence between the encryption identity and the application identity.

In embodiments of the present disclosure, the core network of the operator sets up a dedicated encryption identity management server to store the correspondence between the encryption identity and the application identity. It can be understood that the correspondence between the encryption identity and the application identity can also be stored in the network element device (such as PCF) currently managing the application identity. Therefore, the steps S73-S75 are optional.

The terminal synchronizes the updated encryption content to the operator network, and the operator network synchronizes the relevant content to the core network of the operator. Generally, device manufacturers cannot directly synchronize the content to the core network of the operator, and usually perform content synchronization through a service interface.

In embodiments of the present disclosure, in an update cycle, an encryption identity list is stored in the network element of the core network (such as PCF) that manages the slice for the application identity, and the network element of the core network directly authenticates the registered encryption identity of the terminal.

In the optional step S75, the encryption identity management server sends the unencrypted universal application identity to the terminal.

In embodiments of the present disclosure, the core network of the operator and/or the encryption identity management server carries the unencrypted universal application identity when returning a message to the terminal.

In embodiments of the present disclosure, the terminal may regularly update the encrypted correspondence table to the core network of the operator (the encryption identity management server) subsequently.

The method for activating the service slice provided by embodiments of the present disclosure can realize the slice activation for the application identity based on the encryption identity.

Based on the same idea, embodiments of the present disclosure also provide an apparatus for activating a service slice.

It should be understood that, in order to achieve the aforementioned functions, the apparatus for activating the service slice provided by embodiments of the present disclosure contains hardware structures and/or software modules corresponding to the respective functions. In combination with the units and algorithmic steps of each example disclosed in the embodiments of the present disclosure, the embodiments of the present disclosure can be implemented in the form of hardware or a combination of hardware and computer software. Whether a particular function is implemented in hardware or computer software driving hardware depends on the particular application and design constraints of the technical solutions. A person skilled in the art may use a different approach for each particular application to implement the described functions, and such implementation should not be considered as outside the scope of the technical solutions of the embodiments of the present disclosure.

Figure 10:
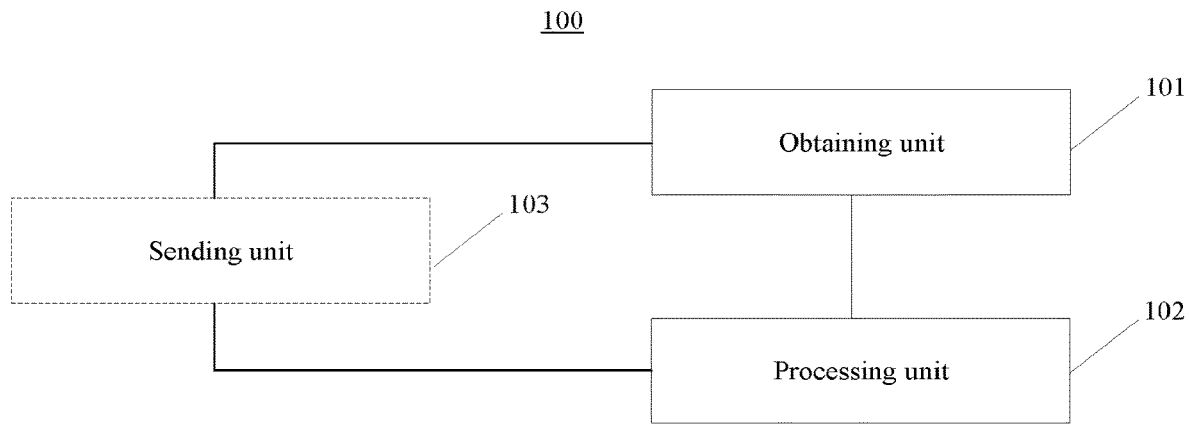
FIG. 10 is a block diagram showing an apparatus for activating a service slice according to an embodiment of the present disclosure.

FIG. 10 is a block diagram showing an apparatus for activating a service slice according to an embodiment of the present disclosure. Referring to FIG. 10, the apparatus 100 for activating the service slice includes an obtaining unit 101 and a processing unit 102.

The obtaining unit 101 is configured to obtain first information, and the first information includes an encryption identity corresponding to an application identity. The processing unit 102 is configured to activate a slice configuration for an application associated with the application identity based on the first information.

In an implementation, the encryption identity corresponding to the application identity is determined by encrypting the application identity using a preset encryption rule.

In an implementation, the encryption identity corresponding to the application identity is determined based on a correspondence between the encryption identity and the application identity.

In an implementation, the encryption identity corresponding to the application identity is determined by encrypting the application identity and/or a terminal identity, and the terminal identity is associated with a terminal hosting the application.

In an implementation, the terminal identity includes a device identity associated with the terminal hosting the application and/or a system identity associated with a system hosting the application.

In an implementation, the obtaining unit 101 is further configured to obtain second information, and the second information includes update information associated with the application identity and the encryption identity.

In an implementation, the processing unit 102 is further configured to determine the application identity corresponding to the encryption identity based on the encryption identity, the preset encryption rule, and/or the correspondence between the encryption identity and the application identity. The apparatus 100 for activating the service slice further includes a sending unit 103, configured to send the application identity corresponding to the encryption identity.

In an implementation, the obtaining unit 101 is configured to obtain the first information through a slice registration request, and the first information is carried by the slice registration request.

Figure 11:
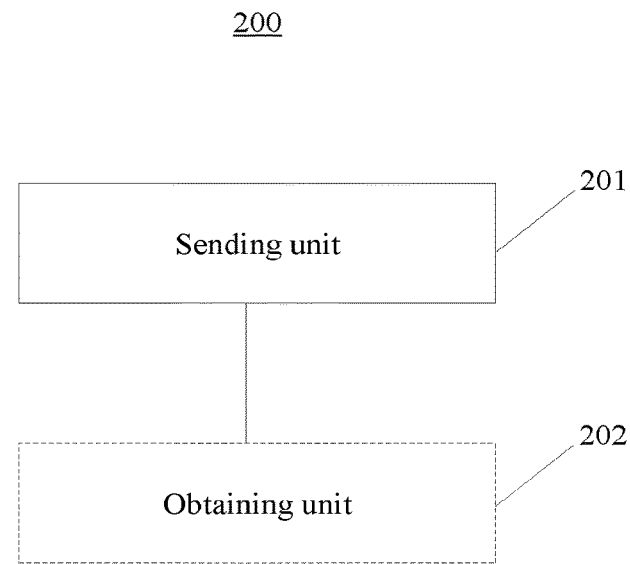
FIG. 11 is a block diagram showing an apparatus for activating a service slice according to an embodiment of the present disclosure.

FIG. 11 is a block diagram showing an apparatus for activating a service slice according to an embodiment of the present disclosure. Referring to FIG. 11, the apparatus 200 for activating the service slice includes a sending unit 201. The sending unit 201 is configured to report first information, and the first information is used to activate a slice configuration for an application associated with an application identity, and includes an encryption identity corresponding to the application identity.

In an implementation, the encryption identity corresponding to the application identity is determined by encrypting the application identity using a preset encryption rule.

In an implementation, the encryption identity corresponding to the application identity is determined based on a correspondence between the encryption identity and the application identity.

In an implementation, the encryption identity corresponding to the application identity is determined by encrypting the application identity and/or a terminal identity, and the terminal identity is associated with a terminal hosting the application.

In an implementation, the terminal identity includes a device identity associated with the terminal hosting the application and/or a system identity associated with a system hosting the application.

In an implementation, the sending unit 201 is further configured to report second information, and the second information includes update information associated with the application identity and the encryption identity.

In an implementation, the apparatus 200 for activating the service slice further includes an obtaining unit 202, configured to obtain the application identity corresponding to the encryption identity.

In an implementation, the sending unit 201 is configured to report the first information through a slice registration request, and the first information is carried by the slice registration request.

Regarding the apparatuses in the above embodiments, the specific way in which each module performs its operation has been described in detail in the embodiments of the methods, and detailed descriptions will be omitted here.

Figure 12:
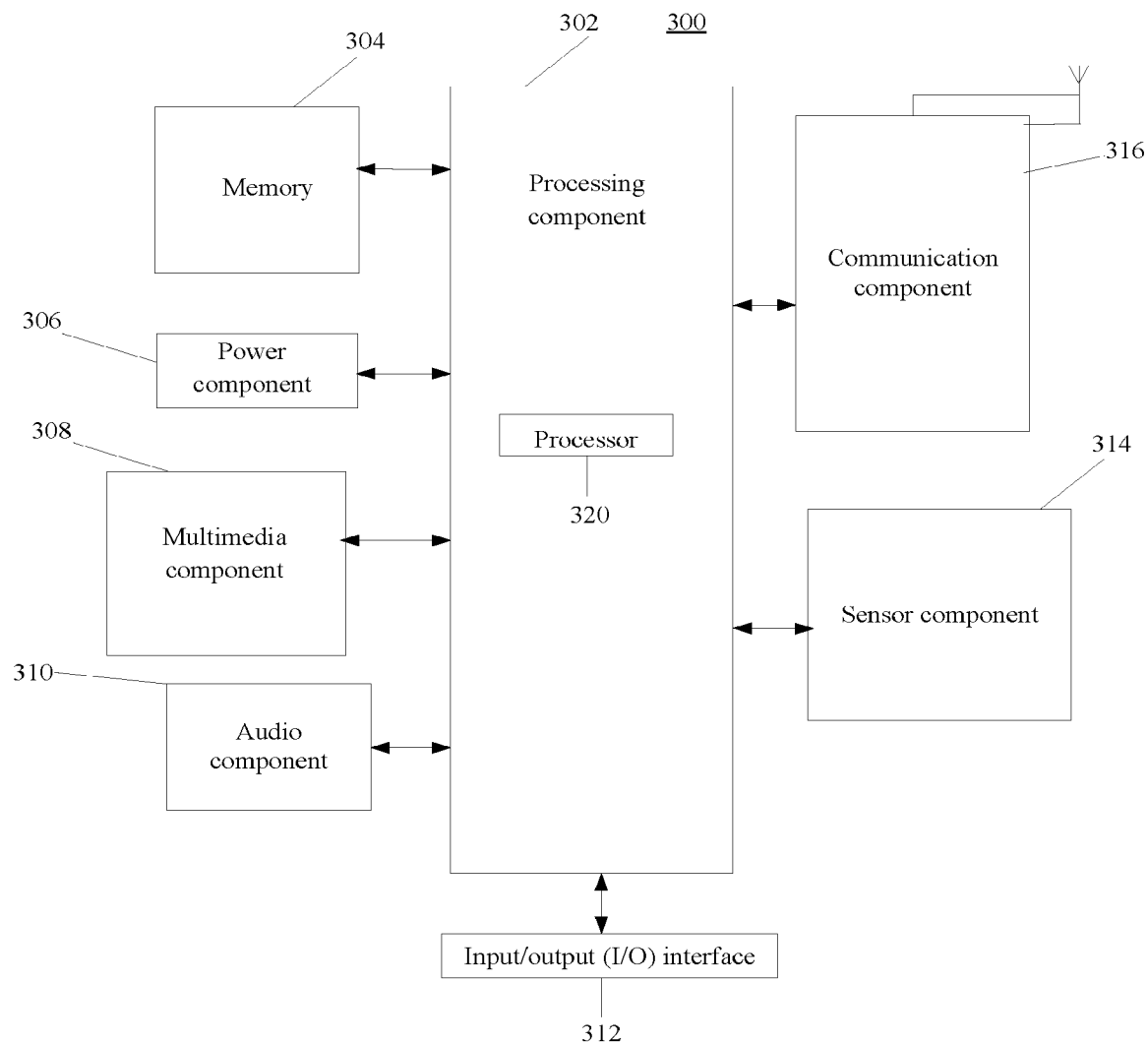
FIG. 12 is a block diagram showing a device for activating a service slice according to an embodiment of the present disclosure.

FIG. 12 is a block diagram showing a device for activating a service slice according to an embodiment of the present disclosure. For example, the device 300 may be a mobile phone, a computer, a digital broadcast terminal, a messaging device, a gaming console, a tablet, a medical device, exercise equipment, a personal digital assistant, and the like.

Referring to FIG. 12, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on any communication standard, such as WiFi, 2G, or 3G, or a combination thereof. In one example embodiment, the communication component 316 receives a broadcast signal or broadcast associated information from an external broadcast management system via a broadcast channel. In one example embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments of the present disclosure, there is also provided a non-transitory computer readable storage medium including instructions, such as included in the memory 304, executable by the processor 320 in the device 300, for performing the above-described methods. For example, the non-transitory computer readable storage medium may be a ROM, a RAM, a CD-ROM, a magnetic tape, a floppy disc, an optical data storage device, and the like.

Figure 13:
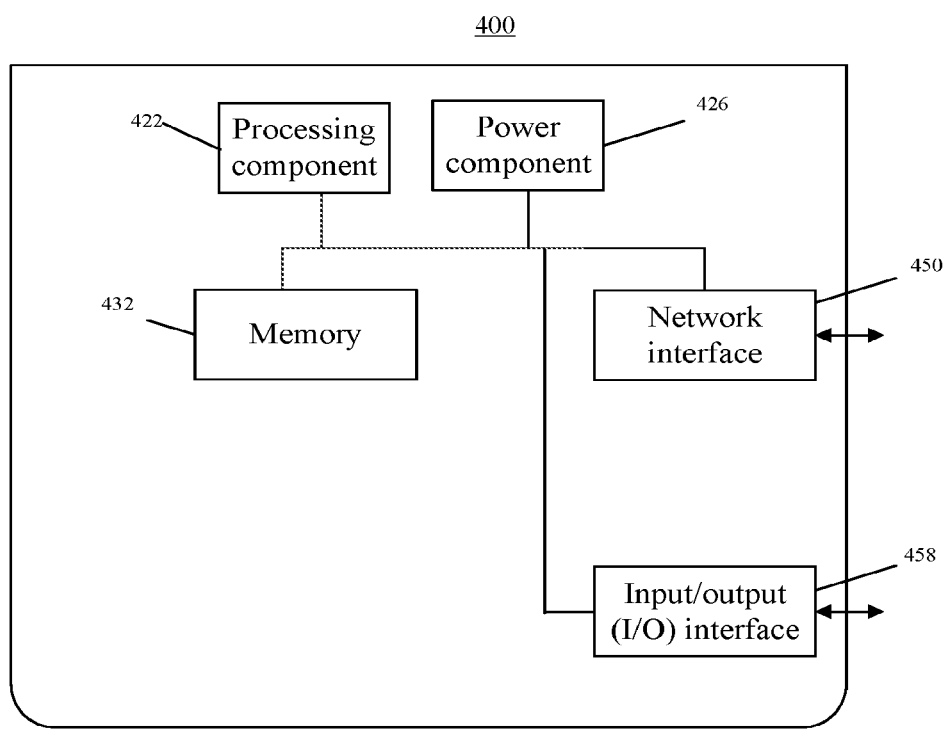
FIG. 13 is a block diagram showing a device for activating a service slice according to an embodiment of the present disclosure.

FIG. 13 is a block diagram showing a device 400 for activating a service slice according to an embodiment of the present disclosure. For example, the device 400 may be provided as a server. Referring to FIG. 13, the device 400 includes a processing component 422 that further includes one or more processors, and memory resources represented by a memory 432 for storing instructions executable by the processing component 422, such as application programs. The application programs stored in the memory 432 may include one or more modules each corresponding to a set of instructions. Further, the processing component 422 is configured to execute the instructions to perform the above described method.

The device 400 may also include a power component 426 configured to perform power management of the device 400, wired or wireless network interface(s) 450 configured to connect the device 400 to a network, and an input/output (I/O) interface 458. The device 400 may operate based on an operating system stored in the memory 432, such as Windows Server™, Mac OS X™, Unix™, Linux™, FreeBSD™, or the like.

In embodiments of the present disclosure, there is provided a non-transitory computer readable storage medium having stored therein instructions, e.g., the memory 432 including instructions. The instructions may be executed by the processing component 422 of the device 400 to perform the above methods. For example, the non-transitory computer readable storage medium may be ROM, Random Access Memory (RAM), CD-ROM, a magnetic tape, a floppy disk, or an optical data storage device and so on.

The present disclosure provides a method for activating a service slice, an apparatus for activating a service slice, and a storage medium.

According to a first aspect of embodiments of the present disclosure, there is provided a method for activating a service slice, including: obtaining first information, wherein the first information includes an encryption identity corresponding to an application identity; and activating a slice configuration for an application associated with the application identity based on the first information.

In an implementation, the encryption identity corresponding to the application identity is determined by encrypting the application identity using a preset encryption rule.

In an implementation, the encryption identity corresponding to the application identity is determined based on a correspondence between the encryption identity and the application identity.

In an implementation, the encryption identity corresponding to the application identity is determined by encrypting the application identity and/or a terminal identity, and the terminal identity is associated with a terminal hosting the application.

In an implementation, the terminal identity includes a device identity associated with the terminal hosting the application and/or a system identity associated with a system hosting the application.

In an implementation, the method for activating the service slice further includes obtaining second information, wherein the second information includes update information associated with the application identity and the encryption identity.

In an implementation, the method for activating the service slice further includes determining the application identity corresponding to the encryption identity based on the encryption identity, the preset encryption rule, and/or the correspondence between the encryption identity and the application identity; and sending the application identity corresponding to the encryption identity.

In an implementation, the obtaining the first information includes: obtaining the first information through a slice registration request, wherein the first information is carried by the slice registration request.

According to a second aspect of embodiments of the present disclosure, there is provided a method for activating a service slice, including reporting first information, wherein the first information is used to activate a slice configuration for an application associated with an application identity, and includes an encryption identity corresponding to the application identity.

In an implementation, the encryption identity corresponding to the application identity is determined by encrypting the application identity using a preset encryption rule.

In an implementation, the encryption identity corresponding to the application identity is determined based on a correspondence between the encryption identity and the application identity.

In an implementation, the encryption identity corresponding to the application identity is determined by encrypting the application identity and/or a terminal identity, and the terminal identity is associated with a terminal hosting the application.

In an implementation, the terminal identity includes a device identity associated with the terminal hosting the application and/or a system identity associated with a system hosting the application.

In an implementation, the method for activating the service slice further includes reporting second information, wherein the second information includes update information associated with the application identity and the encryption identity.

In an implementation, the method for activating the service slice further includes obtaining the application identity corresponding to the encryption identity.

In an implementation, the reporting the first information includes reporting the first information through a slice registration request, wherein the first information is carried by the slice registration request.

According to a third aspect of embodiments of the present disclosure, there is provided an apparatus for activating a service slice, including an obtaining unit, configured to obtain first information, wherein the first information includes an encryption identity corresponding to an application identity, and a processing unit, configured to activate a slice configuration for an application associated with the application identity based on the first information.

In an implementation, the encryption identity corresponding to the application identity is determined by encrypting the application identity using a preset encryption rule.

In an implementation, the encryption identity corresponding to the application identity is determined based on a correspondence between the encryption identity and the application identity.

In an implementation, the encryption identity corresponding to the application identity is determined by encrypting the application identity and/or a terminal identity, and the terminal identity is associated with a terminal hosting the application.

In an implementation, the terminal identity includes a device identity associated with the terminal hosting the application and/or a system identity associated with a system hosting the application.

In an implementation, the obtaining unit is further configured to obtain second information, wherein the second information includes update information associated with the application identity and the encryption identity.

In an implementation, the processing unit is further configured to determine the application identity corresponding to the encryption identity based on the encryption identity, the preset encryption rule, and/or the correspondence between the encryption identity and the application identity; and the apparatus for activating the service slice further includes a sending unit, configured to send the application identity corresponding to the encryption identity.

In an implementation, the obtaining unit is configured to obtain the first information through a slice registration request, wherein the first information is carried by the slice registration request.

According to a fourth aspect of embodiments of the present disclosure, there is provided an apparatus for activating a service slice, including: a sending unit, configured to report first information, wherein the first information is used to activate a slice configuration for an application associated with an application identity, and includes an encryption identity corresponding to the application identity.

In an implementation, the encryption identity corresponding to the application identity is determined by encrypting the application identity using a preset encryption rule.

In an implementation, the encryption identity corresponding to the application identity is determined based on a correspondence between the encryption identity and the application identity.

In an implementation, the encryption identity corresponding to the application identity is determined by encrypting the application identity and/or a terminal identity, and the terminal identity is associated with a terminal hosting the application.

In an implementation, the terminal identity includes a device identity associated with the terminal hosting the application and/or a system identity associated with a system hosting the application.

In an implementation, the sending unit is further configured to report second information, wherein the second information includes update information associated with the application identity and the encryption identity.

In an implementation, the apparatus further includes an obtaining unit, configured to obtain the application identity corresponding to the encryption identity.

In an implementation, the sending unit is configured to report the first information through a slice registration request, wherein the first information is carried by the slice registration request.

According to a fifth aspect of embodiments of the present disclosure, there is provided an apparatus for activating a service slice, including a processor and a memory configured to store instructions executable by the processor. The processor is configured to perform the method for activating the service slice according to the first aspect or any implementation of the first aspect.

According to a sixth aspect of embodiments of the present disclosure, there is provided an apparatus for activating a service slice, including a processor and a memory configured to store instructions executable by the processor. The processor is configured to perform the method for activating the service slice according to the second aspect or any implementation of the second aspect.

According to a seventh aspect of embodiments of the present disclosure, there is provided a non-transitory computer readable storage medium, wherein when instructions in the storage medium are executed by a processor of a network device, the network device is caused to perform the method for activating the service slice according to the first aspect or any implementation of the first aspect.

According to an eighth aspect of embodiments of the present disclosure, there is provided a non-transitory computer readable storage medium, wherein when instructions in the storage medium are executed by a processor of a mobile terminal, the mobile terminal is caused to perform the method for activating the service slice according to the second aspect or any implementation of the second aspect.

The technical solutions provided by embodiments of the present disclosure may include the following beneficial effects by obtaining the encryption identity corresponding to the application identity, the encryption of the application identity is realized, and then the activation of the slice configuration for the application associated with the application identity is performed, which can improve the security of the service slice activation of the application identity.

It is further understood that the term "plurality" in the present disclosure refers to two or more, and other quantifiers are similar. The word "and/or" describes a relationship of associated objects, indicating that there can be three relationships, for example, A and/or B means: A alone, B alone, and A and B together. The character "I" generally indicates that the associated objects before and after "I" is in an "or" relationship. The singular forms "a/an", "said" and "the" are also intended to include plural forms, unless the context clearly indicates otherwise.

It is further understood that the terms "first", "second", etc. are used to describe a variety of information, but the variety of information should not be limited to these terms. These terms are used only to distinguish information of the same type from one another and do not indicate a particular order or level of importance. In fact, the expressions "first" and "second" can be used interchangeably. For example, without departing from the scope of the present disclosure, first information may also be referred to as second information, and similarly, second information may also be referred to as first information.

It is further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

Other embodiments of the disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the present disclosure only be limited by the appended claims.

Obviously, numerous modifications and variations of the disclosure are possible in light of the above teachings. It is therefore to be understood that within the scope of the appended claims, the invention may be practiced otherwise than as specifically described herein.

What is claimed is:

1. A method for activating a service slice, comprising:
   obtaining first information, wherein the first information comprises an encryption identity corresponding to an application identity; and
   activating a slice configuration for an application associated with the application identity based on the first information.

2. The method for activating the service slice according to claim 1, wherein the encryption identity corresponding to the application identity is determined by encrypting the application identity using a preset encryption rule.

3. The method for activating the service slice according to claim 2, wherein the encryption identity corresponding to the application identity is determined by encrypting the application identity and/or a terminal identity, and the terminal identity is associated with a terminal hosting the application; and
   wherein the terminal identity comprises a device identity associated with the terminal hosting the application and/or a system identity associated with a system hosting the application.

4. The method for activating the service slice according to claim 1, wherein the encryption identity corresponding to the application identity is determined based on a correspondence between the encryption identity and the application identity.

5. The method for activating the service slice according to claim 1, wherein the method further comprises:
   obtaining second information, wherein the second information comprises update information associated with the application identity and the encryption identity.

6. The method for activating the service slice according to claim 1, wherein the method further comprises:
   determining the application identity corresponding to the encryption identity based on the encryption identity, a preset encryption rule, and/or a correspondence between the encryption identity and the application identity; and
   sending the application identity corresponding to the encryption identity.

7. The method for activating the service slice according to claim 1, wherein the obtaining the first information comprises:
   obtaining the first information through a slice registration request, wherein the first information is carried by the slice registration request.

8. A method for activating a service slice, comprising:
   reporting first information, wherein the first information is used to activate a slice configuration for an application associated with an application identity, and comprises an encryption identity corresponding to the application identity.

9. The method for activating the service slice according to claim 8, wherein the encryption identity corresponding to the application identity is determined by encrypting the application identity using a preset encryption rule.

10. The method for activating the service slice according to claim 8, wherein the encryption identity corresponding to the application identity is determined based on a correspondence between the encryption identity and the application identity.

11. The method for activating the service slice according to claim 8, wherein the encryption identity corresponding to the application identity is determined by encrypting the application identity and/or a terminal identity, and the terminal identity is associated with a terminal hosting the application; and
   wherein the terminal identity comprises a device identity associated with the terminal hosting the application and/or a system identity associated with a system hosting the application.

12. The method for activating the service slice according to claim 8, wherein the method further comprises:
   reporting second information, wherein the second information comprises update information associated with the application identity and the encryption identity.

13. The method for activating the service slice according to claim 8, wherein the method further comprises:
   obtaining the application identity corresponding to the encryption identity.

14. The method for activating the service slice according to claim 8, wherein the reporting the first information comprises:
   reporting the first information through a slice registration request, wherein the first information is carried by the slice registration request.

15. An apparatus for activating a service slice, comprising:
   a processor; and
   a memory configured to store instructions executable by the processor;
   wherein the processor is configured to perform a method for activating a service slice, and the method comprises:
   obtaining first information, wherein the first information comprises an encryption identity corresponding to an application identity; and
   activating a slice configuration for an application associated with the application identity based on the first information.

16. The apparatus for activating the service slice according to claim 15, wherein the encryption identity corresponding to the application identity is determined by encrypting the application identity using a preset encryption rule.

17. The apparatus for activating the service slice according to claim 15, wherein the encryption identity corresponding to the application identity is determined based on a correspondence between the encryption identity and the application identity.

18. The apparatus for activating the service slice according to claim 15, wherein the encryption identity corresponding to the application identity is determined by encrypting the application identity and/or a terminal identity, and the terminal identity is associated with a terminal hosting the application; and
   wherein the terminal identity comprises a device identity associated with the terminal hosting the application and/or a system identity associated with a system hosting the application.

19. The apparatus for activating the service slice according to claim 15, wherein the processor is further configured to:
   obtain second information, wherein the second information comprises update information associated with the application identity and the encryption identity.

20. The apparatus for activating the service slice according to claim 15, wherein the process or is further configured to determine the application identity corresponding to the encryption identity based on the encryption identity, a preset encryption rule, and/or a correspondence between the encryption identity and the application identity; and the processor is further configured to send the application identity corresponding to the encryption identity.

* * * * *